United States Patent
Wang et al.

(10) Patent No.: US 11,643,070 B2
(45) Date of Patent: May 9, 2023

(54) PARKING ASSIST APPARATUS DISPLAYING PERPENDICULAR-PARALLEL PARKING SPACE

(71) Applicants: TOYOTA JIDOSHA KABUSHIKI KAISHA, Toyota (JP); DENSO CORPORATION, Kariya (JP)

(72) Inventors: Chenyang Wang, Toyota (JP); Yasutaka Matsunaga, Nisshin (JP); Toshihiro Takagi, Nisshin (JP); Satoshi Kozai, Toyota (JP); Masahiro Iino, Kariya (JP); Michihiro Takada, Kariya (JP); Mayuko Maeda, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 208 days.

(21) Appl. No.: 17/066,090

(22) Filed: Oct. 8, 2020

(65) Prior Publication Data

US 2021/0107468 A1 Apr. 15, 2021

(30) Foreign Application Priority Data

Oct. 11, 2019 (JP) .............................. JP2019-187960

(51) Int. Cl.
| | |
|---|---|
| *B60W 30/06* | (2006.01) |
| *B60K 35/00* | (2006.01) |
| *G08G 1/14* | (2006.01) |
| *B60W 60/00* | (2020.01) |
| *B60W 50/10* | (2012.01) |

(52) U.S. Cl.
CPC .............. *B60W 30/06* (2013.01); *B60K 35/00* (2013.01); *B60W 50/10* (2013.01); *B60W 60/001* (2020.02); *G08G 1/143* (2013.01); *B60K 2370/1438* (2019.05); *B60K 2370/152* (2019.05); *B60K 2370/175* (2019.05);
(Continued)

(58) Field of Classification Search
None
See application file for complete search history.

(56) References Cited

U.S. PATENT DOCUMENTS

| | | | | |
|---|---|---|---|---|
| 2017/0132482 A1* | 5/2017 | Kim | ........................ | G06T 7/73 |
| 2017/0369078 A1* | 12/2017 | Freistadt | ............... | B60W 50/10 |

(Continued)

FOREIGN PATENT DOCUMENTS

| | | | | |
|---|---|---|---|---|
| JP | 2009202610 A | * | 9/2009 | ......... G06K 9/00812 |
| JP | 2012-217000 A | | 11/2012 | |

(Continued)

*Primary Examiner* — James J Lee
*Assistant Examiner* — Andrew Sang Kim
(74) *Attorney, Agent, or Firm* — Sughrue Mion, PLLC

(57) ABSTRACT

The parking assist apparatus comprises an ECU. When the ECU recognizes a perpendicular-parallel parking possible space to which a vehicle can not only be perpendicularly parked from a parking start position but also be parallelly parked from the parking start position, the ECU is configured to display any one of a first perpendicular-parallel parking space selection button and a second perpendicular-parallel parking space selection button in such a manner that one of the buttons is superimposed on the perpendicular-parallel parking possible space.

5 Claims, 9 Drawing Sheets

(52) U.S. Cl.
CPC .... *B60K 2370/176* (2019.05); *B60K 2370/21* (2019.05); *B60W 2420/42* (2013.01)

(56) References Cited

U.S. PATENT DOCUMENTS

| | | |
|---|---|---|
| 2018/0178724 A1 | 6/2018 | Hatakeyama et al. |
| 2018/0307919 A1* | 10/2018 | Hayakawa ................ G06T 7/60 |
| 2020/0398826 A1* | 12/2020 | Tsujino ................ B60W 50/14 |

FOREIGN PATENT DOCUMENTS

| | | |
|---|---|---|
| JP | 2013-043510 A | 3/2013 |
| JP | 2016-192772 A | 11/2016 |
| JP | 2018-107754 A | 7/2018 |

\* cited by examiner

PARKING ASSIST APPARATUS DISPLAYING PERPENDICULAR-PARALLEL PARKING SPACE

BACKGROUND

Field

The present disclosure relates to a parking assist apparatus configured to be capable of performing a parking assist control to let a vehicle move from a parking start position to a target parking position autonomously and set the vehicle in a parking state.

Description of the Related Art

A parking assist apparatus disclosed in Japanese Patent Application Laid-Open (kokai) No. 2013-43510 is configured to allow a user (e.g., driver) of the vehicle to select one of functions from various functions including a parking assist function for a parallel parking and a parking assist function for a perpendicular parking, using a select switch and a turn signal lever. The apparatus is configured to perform a parking assist control in accordance with the selected parking assist function.

Another conventional parking assist apparatus (hereinafter, referred to as a "conventional apparatus") of this type is configured to display a parking space selection screen that allows the user to select the target parking space into which the user wants/plans to park the vehicle autonomously using (according to) the selected parking assist function.

The parking space selection screen that the conventional parking assist apparatus displays includes the following images.

(a) frames, each indicating (corresponding to) a parking possible space (or parking space candidate) that is a space into which the vehicle can be parked (move to be parked) in accordance with the selected parking assist function.

(b) buttons, each being to be operated/touched by the user to select/determine one space that includes the target parking position, out of the parking possible spaces.

The conventional apparatus displays the frames indicating the respective parking possible spaces to which the vehicle can be parked in accordance with the selected parking assist function (namely, the parallel parking or the perpendicular parking) on the parking space selection screen after the user selects the parking assist function (namely, after the user selects one of parking ways including the parallel parking and the perpendicular parking).

According to the conventional apparatus, only the frames indicating the parking possible spaces into which the vehicle can be parked in accordance with the perpendicular parking are displayed on the screen when the perpendicular parking is selected. Similarly, according to the conventional apparatus, only the frames indicating the parking possible spaces into which the vehicle can be parked in accordance with the parallel parking are displayed on the screen when the parallel parking is selected.

Therefore, the user can not watch/see the spaces into which the vehicle can be parked both in accordance with the perpendicular parking and with the parallel parking on a screen for selecting/determining the target parking space before the user selects the way of parking. Thus, the conventional apparatus has a room for increasing ease of use (improving convenience to the user).

SUMMARY

The parking assist apparatus (hereinafter, sometimes referred to as a "present disclosed parking assist apparatus") according to the present disclosure is made to improve convenience to the user.

The present disclosed parking assist apparatus (10) is installed on a vehicle (100) and is configured to be capable of performing an autonomous parking control to move the vehicle from a parking start position to a final target parking space so that the vehicle is parked in the final target parking space.

The present disclosed parking assist apparatus comprises:
a camera device (40) configured to capture images around the vehicle to obtain image information;
a touch panel (60) configured to display a screen; and
a control unit (90) configured to be capable of changing the screen displayed on the touch panel.

The control unit is configured to:
specify, based on the image information, a parking possible space that is a space to which the vehicle is moved from the parking start position owing to the autonomous parking control (step 815);
produce, based on the image information, a surrounding image that is an image of surroundings of the vehicle (step 810); and
display, on the touch panel, a parking space selection screen including the surrounding image (G1) and a target parking space selection button (Bt1, Bt2, Bt3, Bt4) corresponding to the parking possible space, the parking space selection screen being configured to be operated by a user of the vehicle to select the final target parking space from the parking possible space, in such a manner that the target parking space selection button is superimposed on the parking possible spaces in the surrounding image.

When the parking possible space is a perpendicular-parallel parking possible space (AR3) to which the vehicle can not only be perpendicularly parked but also be parallelly parked, the control unit is further configured to achieve selectively one of a first display state and a second display state (step 820).

The first display state is a state where a first perpendicular-parallel parking space selection button (Bt3) as the target parking space selection button is displayed in such a manner that the first perpendicular-parallel parking space selection button is superimposed on a first parking possible space (AR3a1, AR3a2) to which the vehicle can be perpendicularly parked within the perpendicular-parallel parking possible space in the surrounding image.

The second display state is a state where a second perpendicular-parallel parking space selection button as the target parking space selection button (Bt4) is displayed in such a manner that the second perpendicular-parallel parking space selection button is superimposed on a second parking possible space (AR3b) to which the vehicle can be parallelly parked within the perpendicular-parallel parking possible space in the surrounding image.

According to the present disclosed parking assist apparatus, when there is the perpendicular-parallel parking possible space, the first perpendicular-parallel parking space selection button is displayed so as to be superimposed on the parking possible space (the first parking possible space) to which the vehicle can be perpendicularly parked within the perpendicular-parallel parking possible space on the parking space selection screen (G1) if the second perpendicular-parallel parking space selection button is not being displayed, the second perpendicular-parallel parking space selection button is displayed so as to be superimposed on the parking possible space (the second parking possible space) to which the vehicle can be parallelly parked within the perpendicular-parallel parking possible space on the parking space selection screen (G1) if the first perpendicular-parallel parking space selection button is not being displayed. Therefore, the user can recognize there is the perpendicular-parallel parking possible space to which the vehicle can not only be perpendicularly parked but also be parallelly parked on the (single/same) parking space selection screen (G1) (that is displayed before the user selects the way of parking, namely, the perpendicular parking or the parallel parking). Consequently, the convenience to the user in determining the final target parking space is improved.

In one of embodiments, the control unit is configured to:
change display states, when the first perpendicular-parallel parking space selection button is touched (step 915: Yes), from the first display state to the second display state (step 925); and
change display states, when the second perpendicular-parallel parking space selection button is touched (step 915: No), from the second display state to the first display state (step 930).

According to the above embodiment, the selection button displayed on the parking space selection screen (G1) is switched between the first perpendicular-parallel parking space selection button and the second perpendicular-parallel parking space selection button, with the touch operation to one of the buttons that is being displayed. This allows the user to easily select either the parallel parking or the perpendicular parking with respect to the perpendicular-parallel parking space. Consequently, the above embodiment can improve convenience when the user selects the final target parking space.

In one of embodiments,
the control unit is configured to:
when the parking possible space is a perpendicular parking possible space (AR1, AR4) to which the vehicle can only be perpendicularly parked, display a perpendicular parking space selection button (Bt1) as the target parking space selection button in such a manner that the perpendicular parking space selection button is superimposed on the perpendicular parking possible space to which the vehicle can only be perpendicularly parked in the surrounding image (step 815, step 820); and
when the parking possible space is a parallel parking possible space (AR2) to which the vehicle can only be parallelly parked, display a parallel parking space selection button (Bt2) as the target parking space selection button in such a manner that the parallel parking space selection button is superimposed on the parallel parking possible space to which the vehicle can only be parallelly parked in the surrounding image (step 815, step 820).

According to the above embodiment, the user can recognize or see whether or not the perpendicular parking possible space is present, whether or not the parallel parking possible space is present, and whether or not the perpendicular-parallel parking possible space is present, from the parking space selection screen. Consequently, the above embodiment can further improve convenience when the user selects the final target parking space.

In one of embodiments, the control unit is configured to display the target parking space selection button in either one of a first display mode and a second display mode, the target parking space selection button displayed in the first display mode indicating that the parking possible space on which the parking space selection button displayed in the first display mode is superimposed is tentatively selected as the final target parking space, and the target parking space selection button displayed in the second display mode indicating that the parking possible space on which the parking space selection button displayed in the second display mode is superimposed is not tentatively selected as the final target parking space (step 820, step 830).

According to the above embodiment, the user can easily recognize which is the tentatively selected final target parking space from the parking space selection screen that displays the perpendicular parking possible space, the parallel parking possible space is present, and the perpendicular-parallel parking possible space, if any. Consequently, the above embodiment can further improve convenience when the user selects the final target parking space.

Notably, in the above description, in order to facilitate understanding of the present disclosure, the constituent elements or parameters of the disclosure corresponding to those of an embodiment of the disclosure which will be described later are accompanied by parenthesized names and/or symbols which are used in the embodiment. However, the constituent elements or parameters of the present disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

Figure 1:
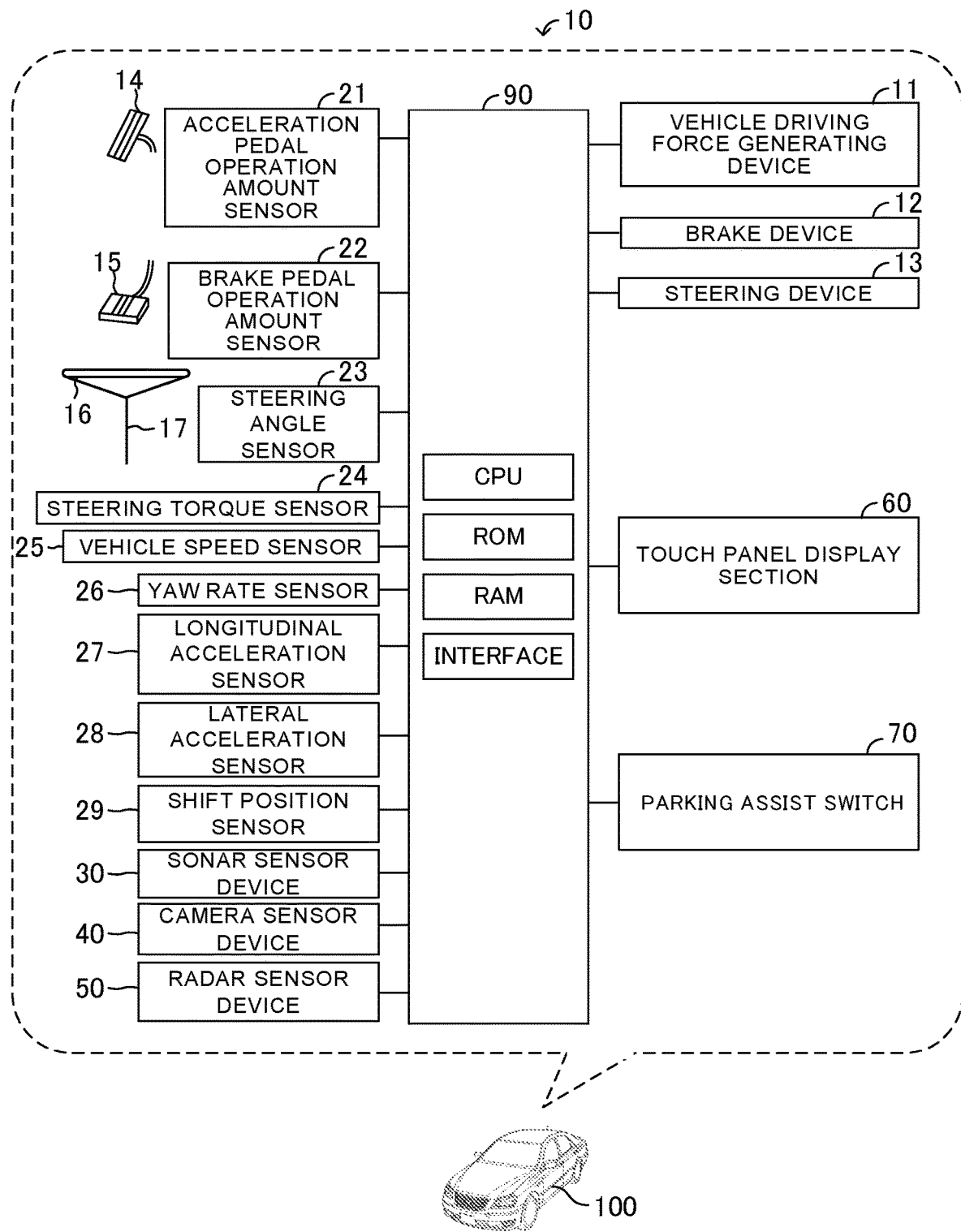
FIG. 1 is a schematic diagram of a parking assist apparatus according to an embodiment of the present disclosure and a vehicle to which the parking assist apparatus is applied.

DESCRIPTION OF THE PREFERRED EMBODIMENTS (Configuration)
A parking assist apparatus for a vehicle according to an embodiment of the present disclosure will next be described with reference to the drawings. FIG. 1 illustrates the parking assist apparatus 10 and the vehicle 100 to which the parking assist apparatus 10 is applied.

As shown in FIG. 1, the parking assist apparatus 10 includes an ECU 90. The ECU is an abbreviation of an "Electronic Control Unit" which is a controller. The ECU 90 includes, as a main component, a microcomputer having a CPU, a ROM, a RAM, a nonvolatile memory, and an interface I/F. The CPU achieves various functions through executing instructions, programs or routines, stored in the ROM. The ECU 90 may be separated into a plurality of ECUs that cooperate with each other.

The vehicle 100 is equipped with a vehicle driving force generating device 11, a brake device 12, and a steering device 13. The vehicle driving force generating device 11 is configured to generate a driving force to drive the vehicle 100 and to transmit the driving force to drive wheels of the vehicle 100. The vehicle driving force generating device 11 includes, for instance, an internal combustion engine, and a motor. The brake device 12 is configured to apply a brake force to wheels of the vehicle 100. The steeling device 13 is configured to generate a steeling torque to steer the vehicle 100 and to apply the steeling torque to steered wheels of the vehicle 100.

The ECU 90 is electrically connected with the vehicle driving force generating device 11, the brake device 12, and the steering device 13. The ECU 90 is configured to control the vehicle driving force generating device 11 so as to control the driving force applied to the drive wheels. The ECU 90 is configured to control the brake device 12 so as to control the brake force applied to the wheels. The ECU 90 is configured to control the steering device 13 so as to control the steering torque applied to the steered wheels.

The parking assist apparatus 10 comprises an acceleration pedal operation amount sensor 21, a brake pedal operation amount sensor 22, a steering angle sensor 23, a steering torque sensor 24, a vehicle speed sensor 25, a yaw rate sensor 26, a longitudinal acceleration sensor 27, a lateral acceleration sensor 28, a shift position sensor 29, a sonar sensor device 30, a camera sensor device 40, a radar sensor device 50, a touch panel display section 60, and a parking assist switch 70.

The acceleration pedal operation amount sensor 21 is electrically connected with the ECU 90 and is configured to output a signal indicative of an acceleration pedal operation amount AP. The ECU 90 is configured to obtain the acceleration pedal operation amount AP based on the signal of the acceleration pedal operation amount sensor 21. The ECU 90 is configured to control the vehicle driving force generating device 11 based on the obtained acceleration pedal operation amount AP in such a manner that the driving force applied to the drive wheels is varied based on the obtained acceleration pedal operation amount AP.

The brake pedal operation amount sensor 22 is electrically connected with the ECU 90 and is configured to output a signal indicative of a brake pedal operation amount BP. The ECU 90 is configured to obtain the brake pedal operation amount BP based on the signal of the brake pedal operation amount sensor 22. The ECU 90 is configured to control the brake device 12 based on the obtained brake pedal operation amount BP in such a manner that the brake force applied to the wheels of the vehicle 100 is varied based on the obtained brake pedal operation amount BP.

The steering angle sensor 23 is electrically connected with the ECU 90 and is configured to output a signal indicative of a rotation angle θst with respect to a neutral position of a steering wheel 16. The ECU 90 is configured to obtain the rotation angle θst as a steering angle θst, based on the signal of the steering angle sensor 23.

The steeling torque sensor 24 is electrically connected with the ECU 90 and is configured to output a signal indicative of a torque TQst input by the user to the steering shaft 17. The ECU 90 is configured to obtain the torque TQst as a steering torque TQst based on the signal of the steering torque sensor 24.

The ECU 90 is configured to control the steering device 13 based on the obtained steering angle θst and the obtained steering torque TQst in such a manner that the steering torque applied to the steered wheels is varied based on the obtained steering angle θst and the obtained steering torque TQst.

The vehicle speed sensor 25 is electrically connected with the ECU 90 and is configured to output a signal indicative of a rotational speed Vrot of each of the wheels of the vehicle 100. The ECU 90 is configured to obtain the rotational speed Vrot of each of the wheels based on the signal of the vehicle speed sensor 25, and to obtain a vehicle speed SPD which is a running speed of the vehicle 100 based on the obtained rotational speed Vrot of each of the wheels.

The yaw rate sensor 26 is electrically connected with the ECU 90 and is configured to output a signal indicative of a yaw rate YR of the vehicle 100. The ECU 90 is configured to obtain the yaw rate YR of the vehicle 100 based on the signal of the yaw rate sensor 26.

The longitudinal acceleration sensor 27 is electrically connected with the ECU 90 and is configured to output a signal indicative of a longitudinal acceleration Gx of the vehicle 100. The ECU 90 is configured to obtain the longitudinal acceleration Gx of the vehicle 100 based on the signal of the longitudinal acceleration sensor 27.

The lateral acceleration sensor 28 is electrically connected with the ECU 90 and is configured to output a signal indicative of a lateral acceleration Gy of the vehicle 100. The ECU 90 is configured to obtain the lateral acceleration Gy of the vehicle 100 based on the signal of the lateral acceleration sensor 28.

The shift position sensor 29 is electrically connected with the ECU 90 and is configured to output a signal indicative of a position of an unillustrated shift lever. The position of the shift lever is a parking position (P), a forward position (D), or a reverse position (R). The ECU 90 is configured to obtain the shift lever position based on the signal of the shift position sensor 29, and to control an unillustrated transmission and/or an unillustrated drive direction changing mechanism, based on the obtained shift lever position. Namely, the ECU 90 is configured to perform a shift control. In addition, the ECU 90 is configured to be capable of controlling the transmission and/or the drive direction changing mechanism as well as the position of the shift lever, regardless of the users operation to the shift lever.

The sonar sensor device 30 comprises a first clearance sonar 301 to a twelfth clearance sonar 312. Hereinafter, the first clearance sonar 301 to the twelfth clearance sonar 312 may sometimes be collectively referred to as clearance sonars 313, as appropriate.

Figure 2:
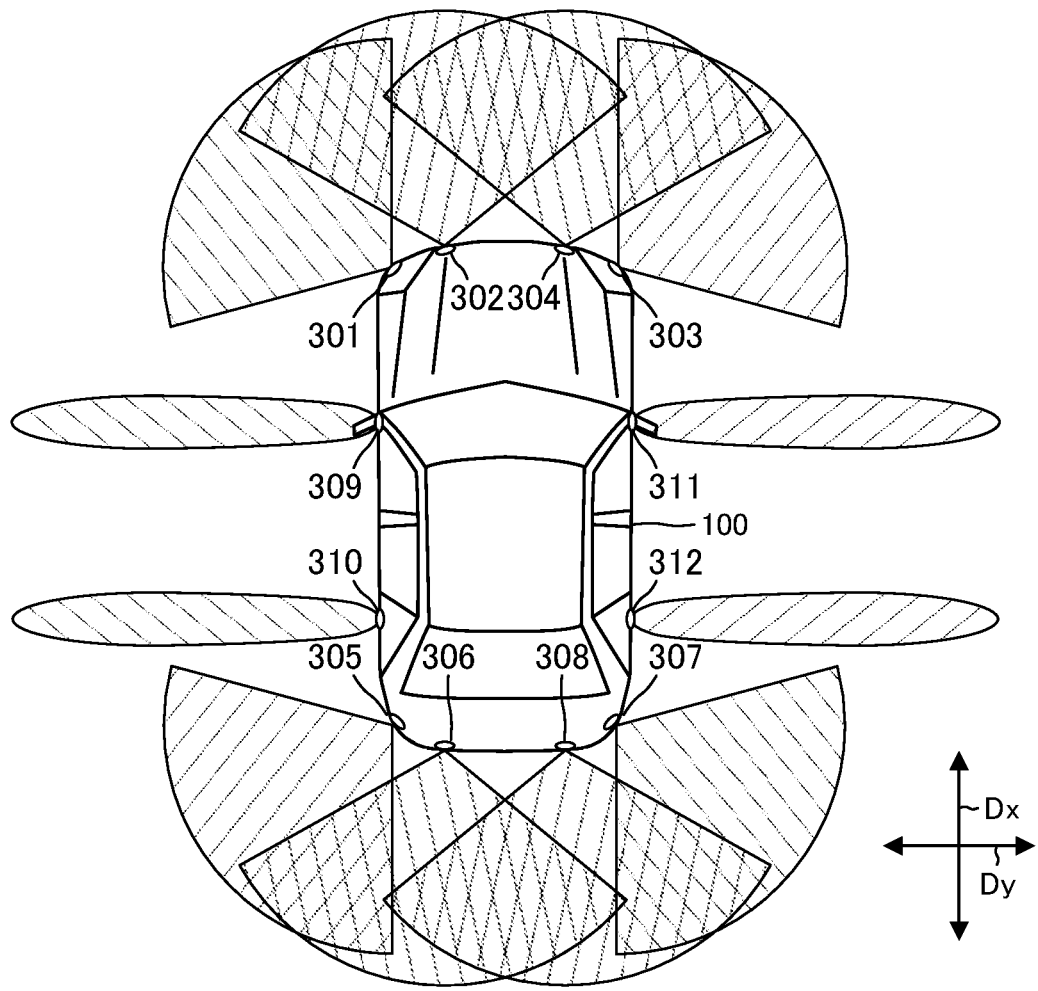
FIG. 2 is a figure illustrating positions of sonar sensors and their detection areas.

As shown in FIG. 2, the first clearance sonar 301 is fixed to the vehicle 100 so as to radiate ultrasonic wave along a front left direction from a front left end part of the vehicle 100.

The second clearance sonar 302 is fixed to the vehicle 100 so as to radiate ultrasonic wave along a front direction from a front end on the left side of the vehicle 100.

The third clearance sonar 303 is fixed to the vehicle 100 so as to radiate ultrasonic wave along a front right direction from a front right end part of the vehicle 100.

The fourth clearance sonar 304 is fixed to the vehicle 100 so as to radiate ultrasonic wave along the front direction from the front end on the right side of the vehicle 100.

The fifth clearance sonar 305 is fixed to the vehicle 100 so as to radiate ultrasonic wave along a rear left direction from a rear left end part of the vehicle 100.

The sixth clearance sonar 306 is fixed to the vehicle 100 so as to radiate ultrasonic wave along a rear direction from a rear end on the left side of the vehicle 100.

The seventh clearance sonar 307 is fixed to the vehicle 100 so as to radiate ultrasonic wave along a rear right direction from a rear right end part of the vehicle 100.

The eighth clearance sonar 308 is fixed to the vehicle 100 so as to radiate ultrasonic wave along the rear direction from the rear end on the right side of the vehicle 100.

The ninth clearance sonar 309 is fixed to the vehicle 100 so as to radiate ultrasonic wave along a left direction from a front left part of the vehicle 100.

The tenth clearance sonar 310 is fixed to the vehicle 100 so as to radiate ultrasonic wave along the left direction from a rear left part of the vehicle 100.

The eleventh clearance sonar 311 is fixed to the vehicle 100 so as to radiate ultrasonic wave along a right direction from a front right part of the vehicle 100.

The twelfth clearance sonar 312 is fixed to the vehicle 100 so as to radiate ultrasonic wave along the right direction from a rear right part of the vehicle 100.

Each of the clearance sonars 313 is configured to receive ultrasonic wave that is reflected from an object.

The sonar sensor device 30 is electrically connected with the ECU 90. The sonar sensor device 30 is configured to transmit, to the ECU 90, information on ultrasonic wave that the clearance sonars 313 radiate and the ultrasonic wave that the clearance sonars 313 receive. The ECU 90 is configured to obtain information on an object present in the vicinity of (or around) the vehicle 100 as "sonar object information", based on the information sent from the sonar sensor device 30.

In FIG. 2, the direction indicated by a reference Dx is a longitudinal (or front-rear) direction of the vehicle 100, and is referred to as a "vehicle longitudinal direction Dx", hereinafter. In FIG. 2, the direction indicated by a reference Dy is a lateral (or width) direction of the vehicle 100, and is referred to as a "vehicle width direction Dy", hereinafter.

The camera sensor device 40 comprises a front camera 41, a rear camera 42, a left camera 43, and a right camera 44. Hereinafter, the front camera 41, the rear camera 42, the left camera 43, and the right camera 44 may sometimes be collectively referred to as "cameras 45", as appropriate.

Figure 3:
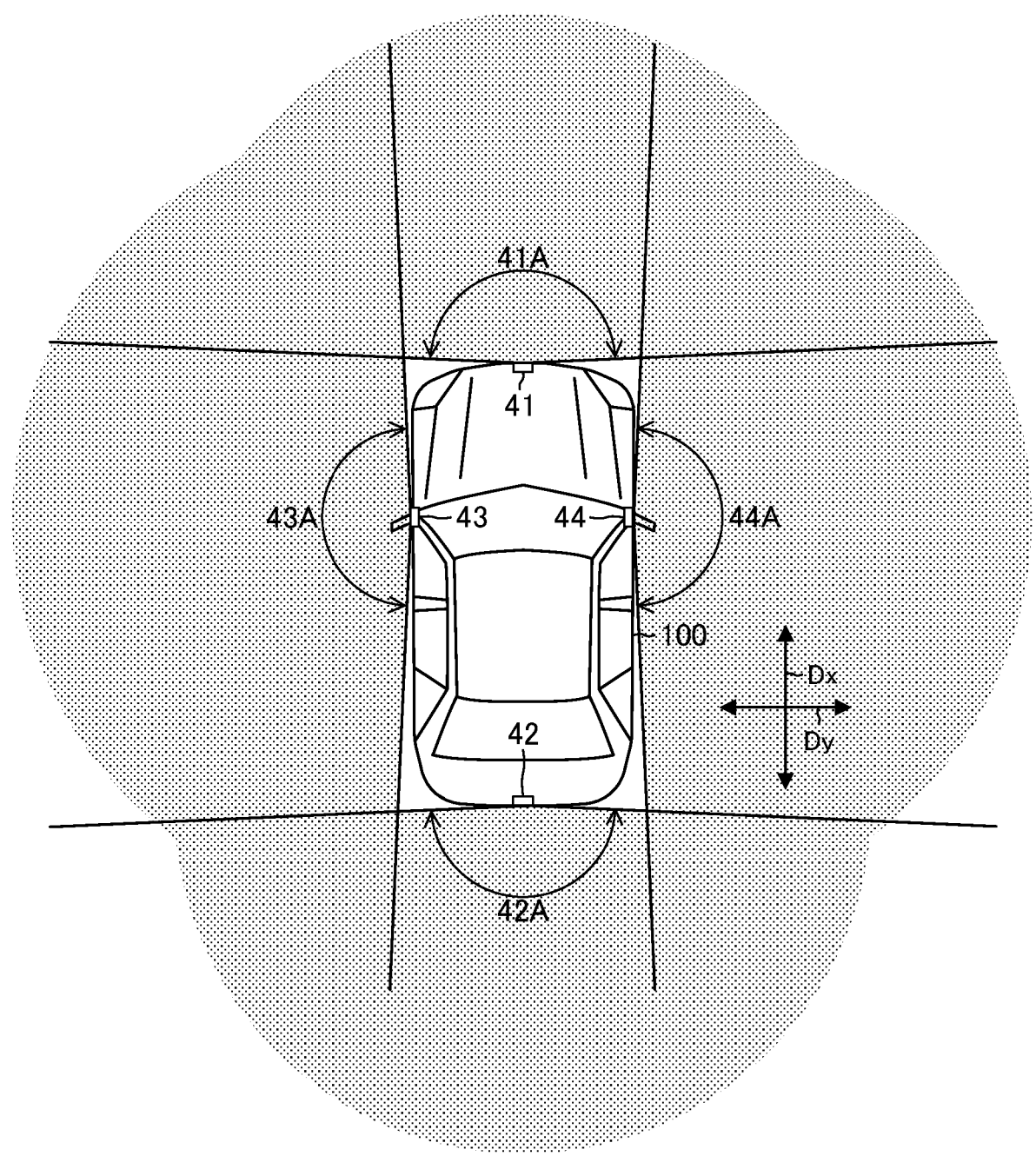
FIG. 3 is a figure illustrating positions of camera sensors and their imaging areas.

As shown in FIG. 3, the front camera 41 is fixed to a front end center part of the vehicle 100 so as to photograph (or capture an image of) a scene in front of the vehicle 100. An angle 41A of view of the front camera 41 is about 180 degrees.

The rear camera 42 is fixed to a rear end center part of the vehicle 100 so as to photograph (or capture an image of) a scene behind the vehicle 100. An angle 42A of view of the rear camera 42 is also about 180 degrees.

The left camera 43 is fixed to a left side part of the vehicle 100 so as to photograph (or capture an image of) a scene on the left of the vehicle 100. An angle 43A of view of the left camera 43 is also about 180 degrees.

The right camera 44 is fixed to a right side part of the vehicle 100 so as to photograph (or capture an image of) a scene on the right of the vehicle 100. An angle 44A of view of the right camera 44 is also about 180 degrees.

The camera sensor device 40 is electrically connected with the ECU 90. The ECU 90 is configured to obtain information on the images of the scenes taken by the cameras 45 through the camera sensor device 40.

The information on the image of the scene taken by the front camera 41 may be referred to as "front image information IMG1", as appropriate.

The information on the image of the scene taken by the rear camera 42 may be referred to as "rear image information IMG2", as appropriate.

The information on the image of the scene taken by the left camera 43 may be referred to as "left image information IMG3", as appropriate.

The information on the image of the scene taken by the right camera 44 may be referred to as "right image information IMG4", as appropriate.

Hereinafter, the front image information IMG1, the rear image information IMG2, the left image information IMG3, and the right image information IMG4 may be collectively referred to as "image information IMG", as appropriate.

The ECU 90 produces/generates surrounding image information using (or based on) the front image information IMG1, the rear image information IMG2, the left image information IMG3, and the right image information IMG4, every time a predetermined time elapses. A screen displayed (or produced) based on the surrounding image information is referred to as a surrounding image (or image of surroundings of the vehicle 100, surrounding image screen). The surrounding image is an image that corresponds to at least a part of area around the vehicle 100 and includes a camera viewpoint image and synthetic images.

The camera viewpoint image is an image viewed from a position of a lens of each of the cameras 45.

One of the synthetic images is an image of the vicinity of the vehicle 100 viewed from a virtual viewpoint placed at an arbitrary position around the vehicle 100. The image of the vicinity of the vehicle 100 viewed from a virtual viewpoint placed at the arbitrary position around the vehicle 100 is referred to as a "virtual viewpoint image".

The virtual viewpoint image can be produced based on various well-known methods (refer to Japanese Patent Application Laid-Open (kokai) Nos. 2012-217000, 2016-192772, and 2018-107754). The ECU 90 may produce/generate an image having the camera viewpoint image and/or the virtual viewpoint image. A vehicle image (e.g., a vehicle polygon or a symbolic image) SP representing a shape of the vehicle 100, a figure image including a line for supporting the parking operation, and a character image including a message for supporting the parking operation are superimposed on the camera viewpoint image and/or the virtual viewpoint image. This type of image may also be referred to as the surrounding image.

One of the methods for producing virtual viewpoint image information from which the virtual viewpoint image is created/produced will be briefly described. The ECU 90 projects "pixels (or picture elements) included in the front image information IMG1, the rear image information IMG2, the left image information IMG3, and the right image information IMG4" onto a predetermined curved projection surface (e.g., a bowl-like surface or a hemispheric dome-like surface) in a virtual three dimensional space (3D space).

A center part of the curved projection surface is regarded as (a location of) the vehicle 100. A part of the curved projection surface other than the center part corresponds to the front image information IMG1, the rear image information IMG2, the left image information IMG3, and the right image information IMG4. The ECU 90 projects "the pixels included in the front image information IMG1, the rear image information IMG2, the left image information IMG3, and the right image information IMG4" onto the part of the curved projection surface other than the center part.

The ECU 90 places the "vehicle polygon representing a shape of the vehicle 100" at the center of the curved projection surface. The ECU 90 sets/places a virtual viewpoint in the virtual 3 dimensional space, and cuts out, as image information (or image), an "area of the curved projection surface" that is covered/encompassed part of the curved projection surface" within a predetermined view angle from the virtual viewpoint. The ECU 90 superimposes the vehicle polygon representing the shape of the vehicle 100 present within the predetermined view angle from the virtual viewpoint on the cut out image information (image). In this manner, the virtual viewpoint image information is produced.

The radar sensor device 50 comprises a first radar sensor 51*a* to a fifth radar sensor 51*e*. Hereinafter, each of the first radar sensor 51*a* to the fifth radar sensor 51*e* sometimes be collectively referred to as a "radar sensor 51", as appropriate.

The radar sensor 51 is a well-known sensor using a millimeter waveband electric wave. The radar sensor 51 is configured to obtain radar sensor object information and transmit the obtained radar sensor object information to the ECU 90. The radar sensor object information is information that can specify a distance between a three dimension object (hereinafter, referred to as a "3D object") and the vehicle 100, a relative speed between the 3D object and the vehicle 100, a relative position (direction) of the 3D object with respect to the vehicle 100.

Figure 4:
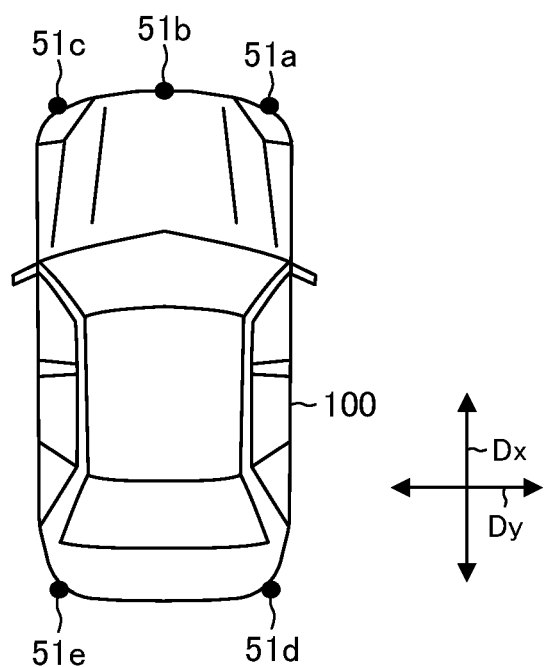
FIG. 4 is a figure illustrating positions of radar sensors.

As shown in FIG. 4, the radar sensor 51 (51*a* to 51*e*) is arranged at respective position of the vehicle 100 so as to obtain the radar sensor object information on the 3D object present in respective area, as described below.

The radar sensor 51*a* is configured to obtain the radar sensor object information on the 3D object present in a front right area of the vehicle 100 (an area ahead of the vehicle 100 on the right).

The radar sensor 51*b* is configured to obtain the radar sensor object information on the 3D object present in a front area of the vehicle 100 (an area ahead of the vehicle 100).

The radar sensor 51*c* is configured to obtain the radar sensor object information on the 3D object present in a front left area of the vehicle 100 (an area ahead of the vehicle 100 on the left).

The radar sensor 51*d* is configured to obtain the radar sensor object information on the 3D object present in a rear right area of the vehicle 100 (an area behind the vehicle 100 on the right).

The radar sensor 51*e* is configured to obtain the radar sensor object information on the 3D object present in a rear left area of the vehicle 100 (an area behind the vehicle 100 on the left).

The touch panel display section 60 is arranged at a position of the vehicle 100 so as to be seen by (or be visible to) the user. In the present example, the touch panel display section 60 is a touch panel type display of a so-called navigation system.

The touch panel display section 60 is electrically connected with the ECU 90. The ECU 90 lets/has the touch panel display section 60 display various images (e.g., screen image (hereinafter, simply referred to as a "screen") including the above described surrounding image).

The parking assist switch 70 is a switch operated (or pressed) by the user.

<Outline of Operation>

The ECU 90 provides a parking assist function to the vehicle 100. The parking assist function includes a function to autonomously drive the vehicle 100 when parking or departing (entering or leaving the parking space) of the vehicle 100 and/or a function to display a support screen for assisting the user of the vehicle 100 to park the vehicle 100 (move the vehicle 100 into the parking space) or to take the vehicle 100 out of the parking space so as to support the users driving operation (i.e., the users parking operation to the parking space and/or the users taking-out operation from the parking space). The ECU 90 is configured to execute a "detecting of parking possible space process", a "screen display control", and an "autonomous parking control", described below, in order to realize/perform the parking assist function.

(Detecting of Parking Possible Space Process)

The ECU 90 is configured to execute the "detecting of parking possible space process" when the vehicle speed SPD is equal to or lower than a vehicle speed threshold. The vehicle speed threshold has been set at a vehicle speed higher than the typical highest speed of the vehicle 100 while the vehicle 100 is being parked, and is, for instance, 16 km/h.

The ECU 90 receives the sonar object information from the clearance sonars 313 and the radar sensor object information form the radar sensors 51, every time a predetermined time elapses. The ECU 90 plots positions of the 3D objects based on the sonar object information and the radar sensor object information, on a two dimensional map (i.e., a two dimensional coordinate system). The two dimensional map corresponds to a plan view of a surrounding of the vehicle 100, wherein an origin of the map is a position of the vehicle 100 (e.g., a center position between the front left wheel and the front right wheel in a plan view), an X axis corresponds to a moving direction (or a front-rear direction) of the vehicle 100, and a Y axis corresponds to a left-right direction (or a width direction) of the vehicle 100.

The ECU 90 obtains the image information IMG (or image data) from the cameras 45, every time a predetermined time elapses. The ECU 90 analyzes the image information IMG and detects 3D object present around (or in the vicinity of) the vehicle 100 to specify the position (distance and direction) of the detected 3D object with respect to the vehicle 100 and the shape of the detected 3D object.

The ECU 90 detects road lines painted on a road surface around the vehicle 100 such as a lane marker(s) for defining a lane and a line(s) defining parking space frame for a parking space, based on the surrounding image information. Furthermore, the ECU 90 specifies a position (distance and direction) of the detected road line with respect to the vehicle 100 and a shape of the detected road line. Thereafter, the ECU 90 plots/draws the detected/specified 3D objects and the detected/specified road lines on the above described two dimensional map.

The ECU 90 recognizes the 3D objects around the vehicle 100 and detects a "space where there is no 3D object" around the vehicle 100, based on the information on the two dimensional map. The ECU 90 determines whether or not the space where there is no 3D object is large enough for parking the vehicle 100 (with sufficient margin) in a viewpoint of a scale and a shape of the space. When the space where there is no 3D object is determined to be large enough for parking of the vehicle 100, the ECU 90 determines/recognize/regards that space as the "parking possible space/spot". For instance, the parking possible space is a space between two road lines adjacent to and parallel to each other or a space between two 3D objects adjacent to and parallel to each other. The parking possible space is typically rectangular and has a shape larger than the plane shape of the vehicle 100 to accommodate the vehicle 100.

The ECU 90 determines which the determined parking possible space is, a space (hereinafter, referred to as a "perpendicular parking possible space") to which the vehicle 100 can be parked in a manner of the perpendicular parking (or the vehicle 100 can be perpendicularly parked) from the parking starting position of the vehicle 100;

a space (hereinafter, referred to as a "parallel parking possible space") to which the vehicle 100 can be parked in a manner of the parallel parking (or the vehicle 100 can be parallelly parked) from the parking starting position of the vehicle 100; or a space (hereinafter, referred to as a "perpendicular-parallel parking possible space") to which the vehicle 100 can be parked in any of the perpendicular parking manner and the parallel parking manner from the parking starting position of the vehicle 100. Namely, the perpendicular-parallel parking possible space is a space to which the vehicle 100 can not only be perpendicularly parked from the parking starting position of the vehicle 100 but also be parallelly parked from the parking starting position of the vehicle 100.

The perpendicular parking is a way of parking to park the vehicle 100 into a parking possible space having a long side substantially perpendicular to the vehicle longitudinal direction Dx of when the vehicle 100 is at the parking start position in such a manner that the vehicle longitudinal direction Dx becomes finally parallel to (or along) the long side when the parking is completed. In other words, the perpendicular parking possible space is a space having a long side that is substantially perpendicular to the vehicle longitudinal direction Dx of when the vehicle 100 is at the parking start position.

The parallel parking is a way of parking to park the vehicle 100 into a parking possible space having a long side substantially parallel to the vehicle longitudinal direction Dx of when the vehicle 100 is at the parking start position in such a manner that the vehicle longitudinal direction Dx becomes finally parallel to (or along) the long side when the parking is completed. In other words, the parallel parking possible space is a space having a long side that is substantially parallel to the vehicle longitudinal direction Dx of when the vehicle 100 is at the parking start position.

(Screen Display Control)

The ECU 90 displays a parking space selection screen G1 (refer to FIG. 6) on the touch panel display section 60 when a predetermined display condition is determined to be satisfied. The parking space selection screen G1 is a screen that allows the user to select/determine a parking space/spot (i.e., a "final target parking space" to which the user wants to park the vehicle 100 using the parking assist control). The predetermined display condition is satisfied, for instance, when the parking assist function is effective owing to an operation on the parking assist switch 70 and the vehicle is not moving (or is in a stopped state).

Figure 5:
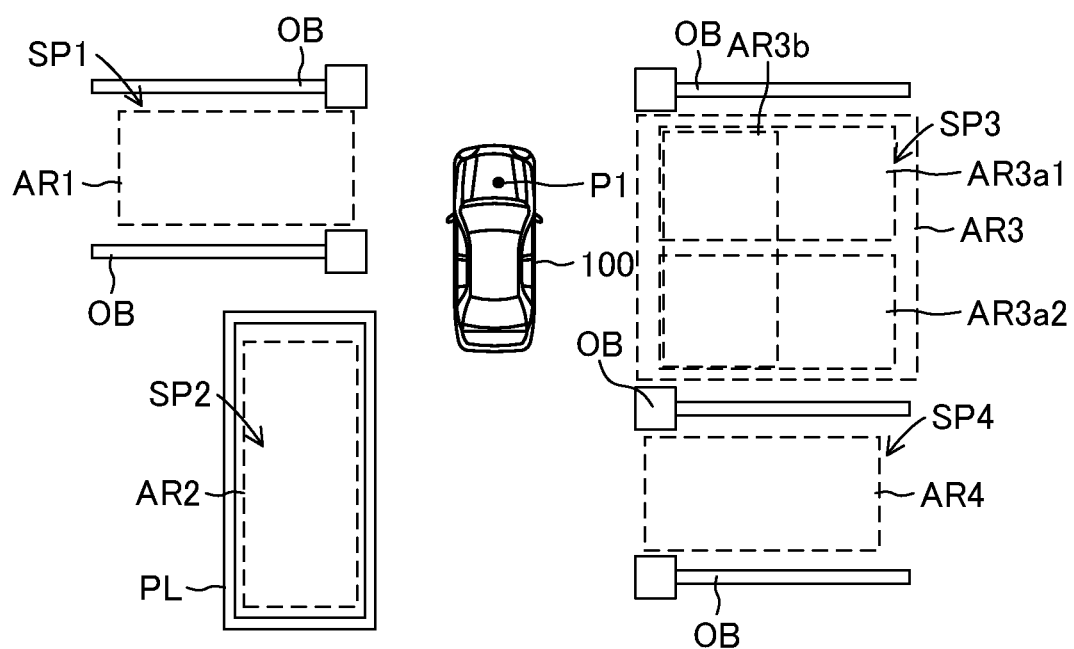
FIG. 5 shows an example of parking spaces.

For example, as shown in FIG. 5, it is assumed that the predetermined display condition has become satisfied, when the vehicle 100 is in the stopped state (does not move) at a position P1 in a parking area that includes a parking space (spot) SP1, a parking space SP2, a parking space SP3, and a parking space SP4.

In this example, each of the parking space SP1 and the parking space SP4 is a space between (or defined by) objects OB adjacent to and parallel to each other. The vehicle 100 can be parked/moved to each of the parking space SP1 and the parking space SP4 from the position P1 which is the parking start position only with the perpendicular parking. In other words, the vehicle 100 can only be perpendicularly parked into each of the parking space SP1 and the parking space SP4. The parking space SP2 is a space defined by (surrounded by) parking frame line PL. The vehicle 100 can be parked/moved to the parking space SP2 from the position P1 only with the parallel parking. In other words, the vehicle 100 can only be parallelly parked into the parking space SP2. The parking space SP3 is a space between (or defined by) objects OB adjacent to and parallel to each other. The vehicle 100 can be parked/moved to the parking space SP3 from the position P1 with any of the perpendicular parking and the parallel parking. In other words, the vehicle 100 can be perpendicularly parked and parallelly parked into the parking space SP3.

The detecting of parking possible space process is started while the vehicle 100 is moving and continues being executed until the vehicle 100 stops at the position P1. As a result, the ECU 90 has been recognizing/regarding the parking space SP1 as the perpendicular parking possible space AR1, and recognizing/regarding the parking space SP4 as the perpendicular parking possible space AR4, when the vehicle 100 is in the stopped state at the position P1. The ECU 90 has been recognizing/regarding the parking space SP2 as the parallel parking possible space AR2, when the vehicle 100 is in the stopped state at the position P1.

Furthermore, the ECU 90 has been recognizing/regarding the parking space SP3 as the perpendicular-parallel parking possible space AR3, when the vehicle 100 is in the stopped state at the position P1. In addition, the ECU 90 has been recognizing/regarding two of perpendicular parking possible spaces AR3$a$1 and AR3$a$2 in the perpendicular-parallel parking possible space AR3, and one parallel parking possible space AR3$b$ in the perpendicular-parallel parking possible space AR3. Hereinafter, when the perpendicular parking possible space AR1, the parallel parking possible space AR2, the perpendicular-parallel parking possible space AR3, the perpendicular parking possible spaces AR3$a$1 and AR3$a$2, the parallel parking possible space AR3$b$, and the perpendicular parking possible space AR4 need not to be distinguished from each other, those spaces are referred to as "parking possible spaces AR".

Figure 6:
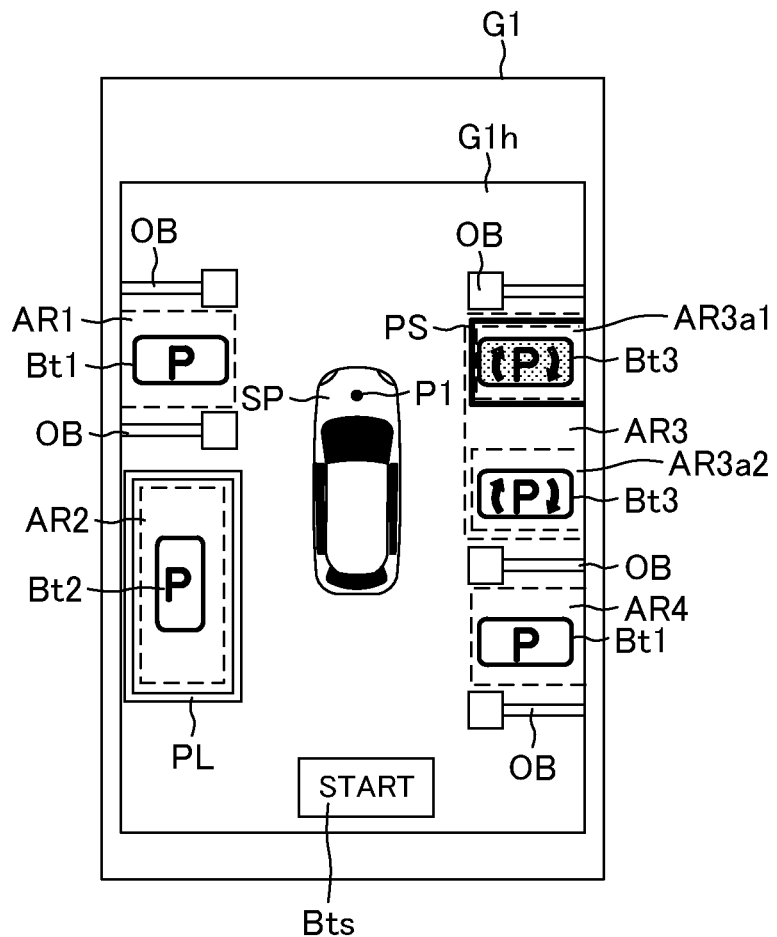
FIG. 6 shows an example of a displayed screen on a touch panel.

In the above example, the ECU 90 displays a parking space selection screen G1 shown in FIG. 6 on the touch panel display section 60 when the predetermined display condition is determined to be satisfied.

The parking space selection screen G1 includes: a plane view (or a bird's-eye-view) G1$h$; a vehicle polygon/symbol SP, two perpendicular parking space selection buttons Bt1, one parallel parking space selection button Bt2, two first perpendicular-parallel parking space selection buttons Bt3, one target parking space frame PS, and one start button Bts.

The plane view G1$h$ is the virtual viewpoint image whose virtual viewpoint is set at a position immediately above the vehicle 100. An "area of the above described projection surface" that is covered/encompassed within a predetermined view angle from the virtual viewpoint is cut out from the curved projection surface as the plane view G1$h$. The vehicle polygon/symbol SP is superimposed on the plane view G1$h$ at the position P1 (parking start position) in the plane view G1$h$.

The two perpendicular parking space selection buttons Bt1 are superimposed on the perpendicular parking possible space AR1 and the perpendicular parking possible space AR4, respectively. Each of the perpendicular parking space selection buttons Bt1 comprises a rectangular frame, a letter "P" placed at a center of the rectangular frame, and a background. Each of the perpendicular parking space selection buttons Bt1 is displayed in such a manner that a long side of the perpendicular parking space selection button Bt1 is substantially perpendicular to the longitudinal axis of the vehicle polygon SP.

The parallel parking space selection button Bt2 is superimposed on the parallel parking possible space AR2. The parallel parking space selection button Bt2 comprises a rectangular frame, a letter "P" placed at a center of the rectangular frame, and a background. The parallel parking space selection button Bt2 is displayed in such a manner that a long side of the parallel parking space selection button Bt2 is substantially parallel to the longitudinal axis of the vehicle polygon SP.

The two first perpendicular-parallel parking space selection buttons Bt3 are superimposed on perpendicular parking possible spaces AR3a1 and AR3a2, respectively. Each of the first perpendicular-parallel parking space selection buttons Bt3 comprises a rectangular frame, a letter "P" placed at a center of the rectangular frame, a pair of arrows, and a background. A pair of the arrows are placed to sandwich the letter "P" in a left-right direction. Each of the arrows indicates a clockwise direction. Each of the first perpendicular-parallel parking space selection buttons Bt3 is displayed in such a manner that a long side of the first perpendicular-parallel parking space selection button Bt3 is substantially perpendicular to the longitudinal axis of the vehicle polygon SP.

Hereinafter, when the perpendicular parking space selection button Bt1, the parallel parking space selection button Bt2, and the first perpendicular-parallel parking space selection buttons Bt3 (and a second perpendicular-parallel parking space selection buttons Bt4 described later and shown in FIG. 7) need not to be distinguished from each other, those buttons are referred to as "parking space selection buttons Bt". The parking space selection button Bt is formed of an image. The parking space selection button Bt displayed on the touch panel display section 60 is operated by the user when the user touches the parking space selection button Bt. Hereinafter, the operation to touch a button displayed on the touch panel display section 60 is referred as a "touch operation". Thus, performing the touch operation to the button means touching the button. The touch operation to the parking space selection button Bt generates an operation signal in response to the touch operation. The ECU 90 receives the operation signal.

The ECU 90 displays the parking space selection button Bt in either a first display mode or a second display mode. If a certain parking possible space AR is selected as a target parking space (or may be referred to as a "candidate/tentative target parking space") that is a space/spot (or area) to which the vehicle 100 is tentatively planned to be parked autonomously, the ECU 90 displays the parking space selection button Bt in the first display mode (in such a manner that the parking space selection button Bt is superimposed/placed on the certain parking possible space AR). If a certain parking possible space AR is not selected as the (tentative) target parking space, the ECU 90 displays the parking space selection button Bt in the second display mode (in such a manner that the parking space selection button Bt is superimposed/placed on the certain parking possible space AR).

When the touch operation is performed to the parking space selection button Bt that is being displayed in the second display mode (i.e., when the parking space selection button Bt that is being displayed in the second display mode is touched), the ECU 90 selects/determines the parking possible space AR on which that touched parking space selection button Bt is superimposed as the (tentative) target parking space, and displays that touched parking space selection button Bt in the first display mode. In other words, when the parking space selection button Bt that is being displayed in the second display mode is touched, the ECU 90 switches the display modes of the touched parking space selection button Bt from the second display mode to the first display mode. Further, in this case, the ECU 90 switches the display modes of the parking space selection button Bt that has been displayed in the first display mode and is other than the touched parking space selection button Bt to the second display mode.

In the present example, the parking space selection button Bt displayed in the first display mode is different from the parking space selection button Bt displayed in the second display mode only in color of the background of the parking space selection button Bt. The color of parking space selection button Bt displayed in the first display mode is a first color (e.g., blue) and the color of parking space selection button Bt displayed in the second display mode is a second color (e.g., white) different from the first color.

In the parking space selection screen G1 shown in FIG. 6, the first perpendicular-parallel parking space selection button Bt3 that is superimposed on the perpendicular parking possible space AR3a1 is displayed in the first display mode. The other perpendicular-parallel parking space selection button Bt3, the two perpendicular parking space selection buttons Bt1, and the one parallel parking space selection button Bt2 are displayed in the second display mode.

The target parking space frame PS is formed of frame lines, and is superimposed on the parking possible space AR that is selected as the (tentative) target parking space. In the parking space selection screen G1 shown in FIG. 6, the target parking space frame PS is displayed so as to be superimposed on the perpendicular parking possible space AR3a1 that has been selected as the (tentative) target parking space.

The start button Bts is a button to be touched (a button to which the touch operation is performed) by the user in order to let the ECU 90 start executing the autonomous parking control.

It is now assumed that the first perpendicular-parallel parking space selection buttons Bt3 that is being displayed in the first display mode in the parking space selection screen G1 shown in FIG. 6 is touched. In this case, as shown in FIG. 7, the ECU 90 changes the (tentative) target parking space to the parallel parking possible space AR3b that is within the perpendicular-parallel parking possible space AR3 on which the first perpendicular-parallel parking space selection buttons Bt3 has been superimposed.

At the same time, the ECU 90 displays one second perpendicular-parallel parking space selection button Bt4 in the first display mode in place of the two first perpendicular-parallel parking space selection buttons Bt3, in such a manner that the second perpendicular-parallel parking space selection button Bt4 is superimposed on the parallel parking possible space AR3b in the perpendicular-parallel parking possible space AR3.

The second perpendicular-parallel parking space selection button Bt4 comprises a rectangular frame, a letter "P" placed at a center of the rectangular frame, a pair of arrows, and a background. A pair of the arrows are placed to sandwich the letter "P" in an upper-lower direction. Each of the arrows indicates a clockwise direction. The second perpendicular-parallel parking space selection button Bt4 is displayed in such a manner that a long side of the second perpendicular-parallel parking space selection button Bt4 is substantially parallel to the longitudinal axis of the vehicle polygon SP.

The ECU 90 displays the target parking space frame PS in such a manner that the target parking space frame PS is superimposed on the parallel parking possible space AR3*b* that is within the perpendicular-parallel parking possible space AR3 on which the second perpendicular-parallel parking space selection button Bt4 is superimposed.

Figure 7:
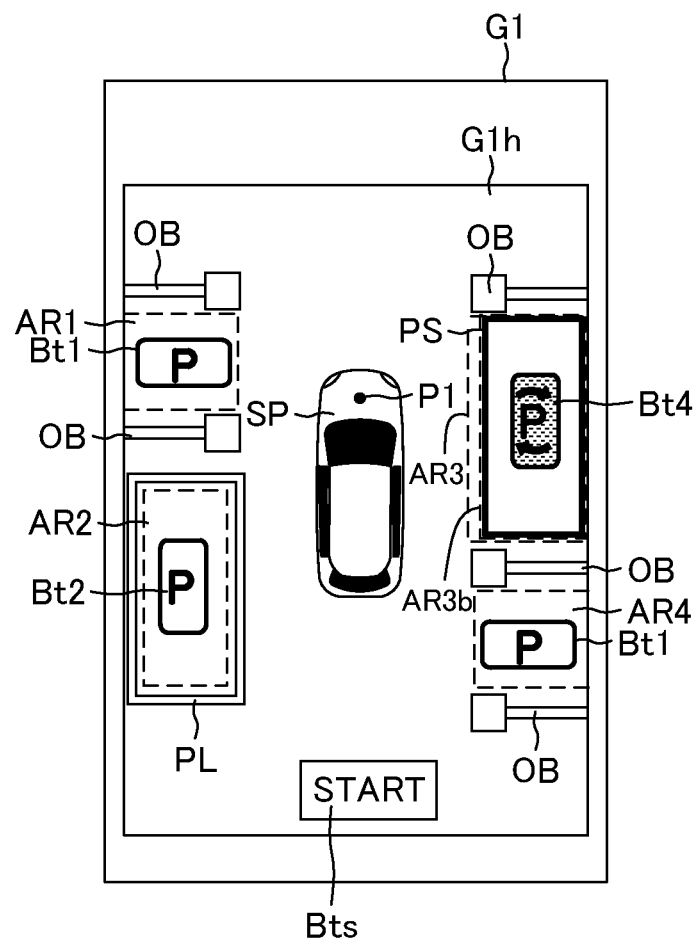
FIG. 7 shows another example of a displayed screen on the touch panel.

Meanwhile, when the second perpendicular-parallel parking space selection button Bt4 displayed in the first display mode in the parking space selection screen G1 shown in FIG. 7 is touched, the ECU 90 changes the (tentative) target parking space to the perpendicular parking possible space AR3*a*1 that is within the perpendicular-parallel parking possible space AR3 on which the second perpendicular-parallel parking space selection buttons Bt4 has been superimposed.

The ECU 90 replaces the second perpendicular-parallel parking space selection button Bt4 that is superimposed on the parallel parking possible space AR3*b* within the perpendicular-parallel parking possible space AR3 with the two first perpendicular-parallel parking space selection buttons Bt3. In addition, the ECU 90 displays one of the two first perpendicular-parallel parking space selection buttons Bt3 in the first display mode in such a manner that one of the two first perpendicular-parallel parking space selection buttons Bt3 is superimposed on the perpendicular parking possible space AR3*a*1 in the same perpendicular-parallel parking possible space AR3. Furthermore, the ECU 90 displays the other one of the two first perpendicular-parallel parking space selection buttons Bt3 in the second display mode in such a manner that the other one of the two first perpendicular-parallel parking space selection buttons Bt3 is superimposed on the perpendicular parking possible space AR3*a*2 in the same perpendicular-parallel parking possible space AR3. At the same time, the ECU 90 displays the target parking space frame PS in such a manner that the target parking space frame PS is superimposed on the perpendicular parking possible space AR3*a*1 that has been selected as the (tentative) target parking space.

(Execution of Autonomous Parking Control)

When the start button Bts is touched, the ECU 90 sets a final target parking space to the (tentative) target parking space (that is the parking possible space AR on which the target parking space frame PS is superimposed) that has been selected when the start button Bts is touched (at the time when the touch operation to the start button Bts is performed). The ECU 90 executes the autonomous parking control to autonomously move the vehicle 100 from the position P1 to a target parking position that is a predetermined position within the final target parking space, and thereafter, set the vehicle 100 in the parking state.

For instance, it is now assumed that the user touches (performs the touch operation to) the start button Bts when the parking space selection screen G1 shown in FIG. 7 has been being displayed on the touch panel display section 60. In this case, the ECU 90 autonomously moves the vehicle 100 from the position P1 to the parallel parking possible space AR3*b* on which the target parking space frame PS is superimposed, and thereafter, sets the vehicle 100 in the parking state. Namely, the ECU 90 performs the autonomous parking control so as to park the vehicle 100 into the space corresponding a space surrounded by the target parking space frame PS.

<Specific Operation>

Figure 8:
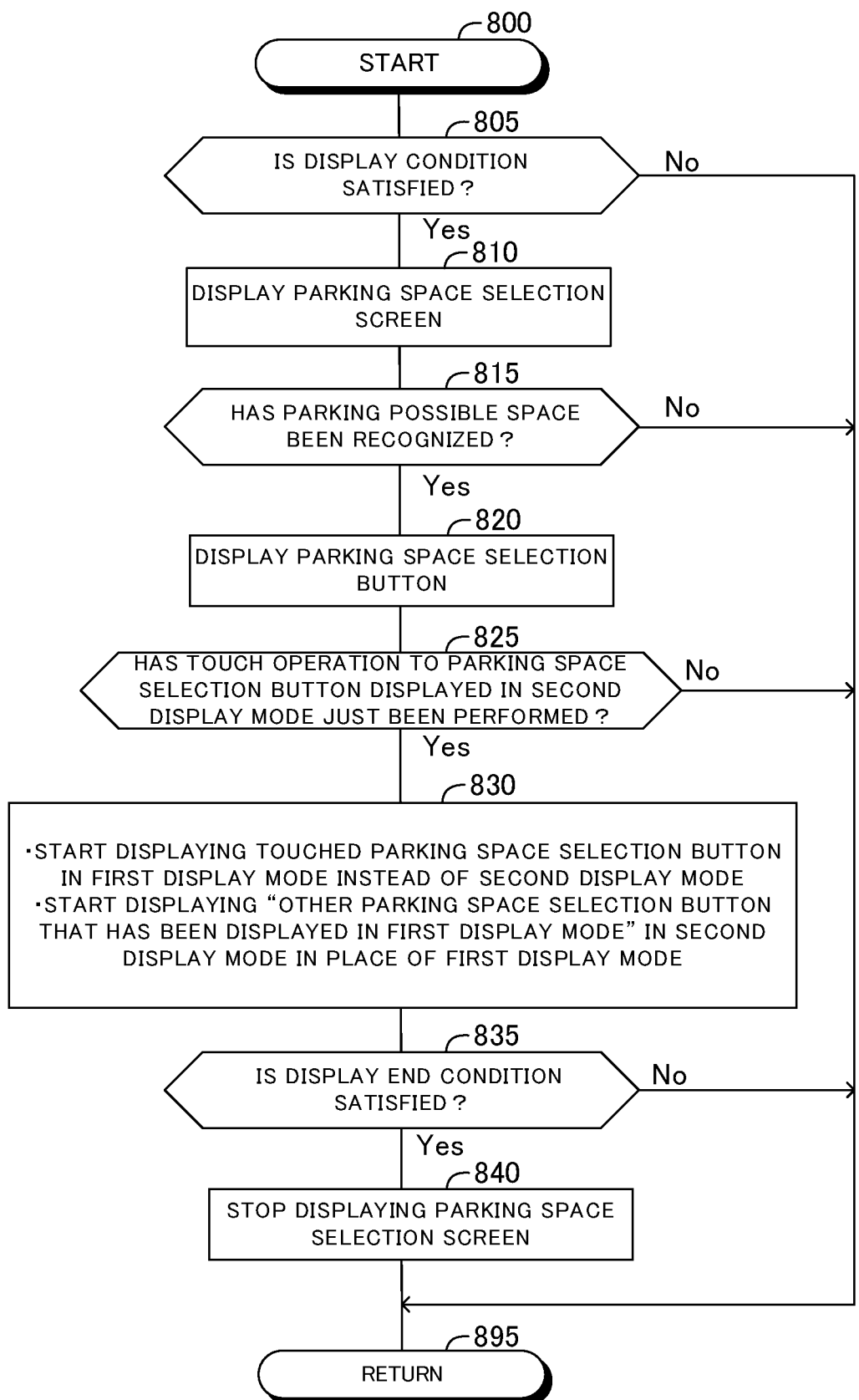
FIG. 8 is a flowchart representing a routine executed by a CPU of the ECU shown in FIG. 1.

The CPU (hereinafter, simply referred to as the "CPU") of the ECU 90 is configured to execute a routine shown by a flowchart in FIG. 8, every time a predetermined time elapses.

Therefore, at an appropriate time point, the CPU starts processing of step 800 and proceeds to step 805 so as to determine whether or not the display condition for the parking space selection screen G1 is satisfied. The display condition for the parking space selection screen G1 is a condition that is to be satisfied to display the parking space selection screen G1 at an appropriate timing.

When the display condition for the parking space selection screen G1 is not satisfied, the CPU makes a "No" determination at step 805, and proceeds to step 895 to terminate the present routine tentatively.

In contrast, when the display condition for the parking space selection screen G1 is satisfied, the CPU makes a "Yes" determination at step 805, and proceeds to step 810 to display the parking space selection screen G1 on the touch panel display section 60.

Thereafter, the CPU proceeds to step 815 to determine whether or not the CPU has recognized at least one parking possible space AR (at least one of the perpendicular parking possible space, the parallel parking possible space, and the perpendicular-parallel parking possible space). When the CPU has not recognized any of the parking possible spaces AR, the CPU makes a "No" determination at step 815, and proceeds to step 895 to terminate the present routine tentatively.

To the contrary, when the CPU has recognized the parking possible space AR, the CPU makes a "Yes" determination at step 815, and proceeds to step 820 so as to display the parking space selection button Bt in either the first display mode or the second display mode in such a manner that the parking space selection button Bt is superimposed on the parking possible space AR. Namely, the CPU displays the parking space selection button Bt in the first display mode when the corresponding parking possible space AR is selected as the (tentative) target parking space, and displays the parking space selection button Bt in the second display mode when the corresponding parking possible space AR is not selected as the (tentative) target parking space. It should be noted that the CPU automatically determines the most appropriate parking possible space AR as the (tentative) target parking space according to a certain rule when the CPU makes a "Yes" determination at step 815 at the first time after the display condition for the parking space selection screen G1 is satisfied.

Subsequently, the CPU proceeds to step 825 so as to determine whether or not the parking space selection button Bt displayed in the second display mode has just been touched (i.e., whether or not the touch operation to the parking space selection button Bt displayed in the second display mode has just been performed).

When it is not determined that the parking space selection button Bt displayed in the second display mode has just been touched, the CPU makes a "No" determination at step 825, and proceeds to step 895 to terminate the present routine tentatively.

In contrast, when it is determined that the parking space selection button Bt displayed in the second display mode has just been touched, the CPU makes a "Yes" determination at step 825, and proceeds to step 830 so as to start displaying the touched parking space selection button Bt in the first display mode instead of the second display mode. In other words, the CPU switches the display modes for the button Bt that has just been touched from the second display mode to the first display mode. In addition, at step 830, the CPU starts displaying the "other parking space selection button Bt that has been displayed in the first display mode" in the second display mode in place of the first display mode.

Thereafter, the CPU proceeds to step 835 so as to determine whether or not a display end condition for the parking space selection screen G1 is satisfied. The end display condition for the parking space selection screen G1 is a condition that is to be satisfied to stop displaying the screen G1 at an appropriate timing.

When the display end condition for the parking space selection screen G1 is not satisfied, the CPU makes a "No" determination at step 835, and proceeds to step 895 to terminate the present routine tentatively.

In contrast, when the display end condition for the parking space selection screen G1 is satisfied, the CPU makes a "Yes" determination at step 835, and proceeds to step 840 so as to stop displaying the parking space selection screen G1. Thereafter, the CPU proceeds to step 895 to terminate the present routine tentatively.

Figure 9:
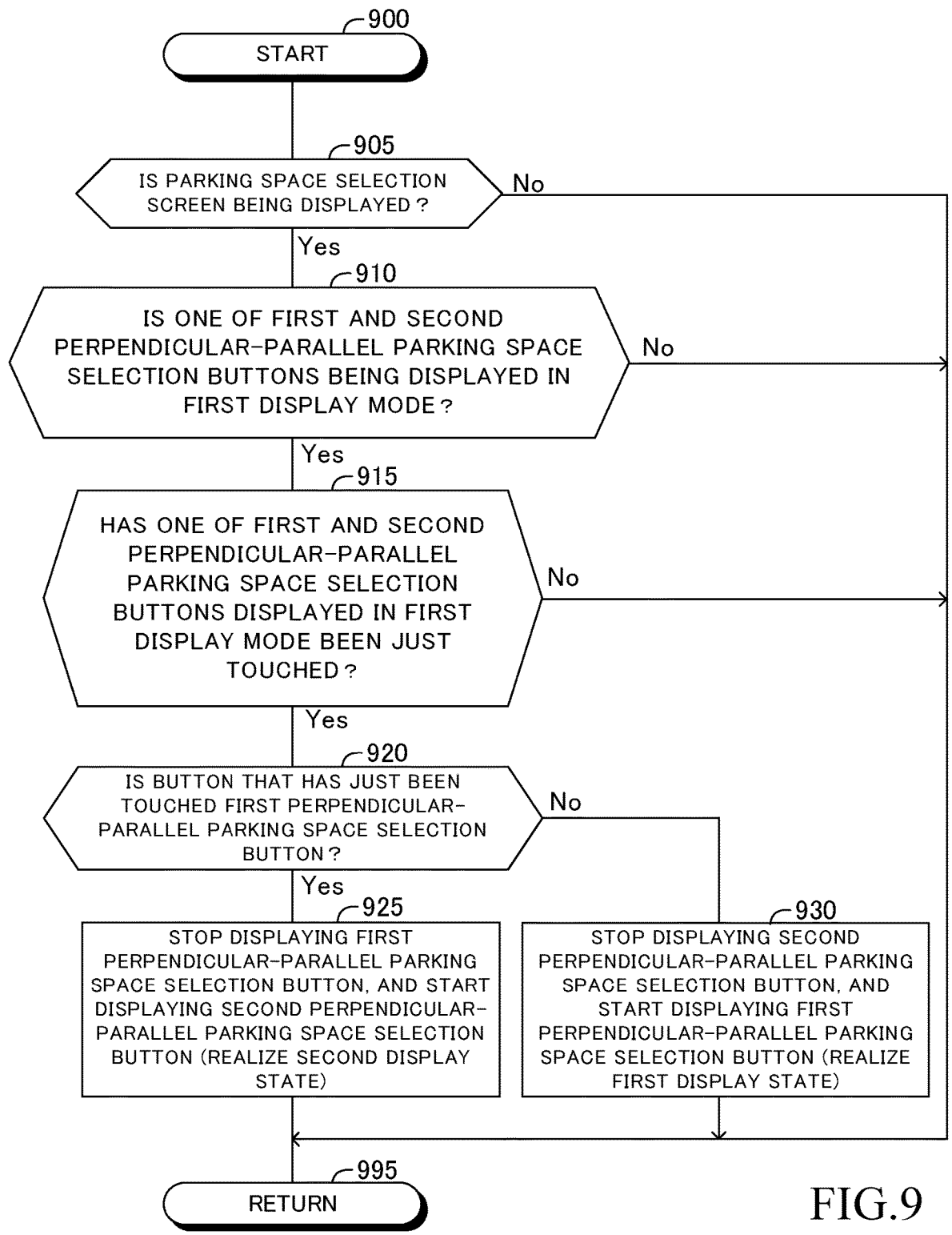
FIG. 9 is a flowchart representing another routine executed by the CPU of the ECU shown in FIG. 1.

The CPU is configured to execute a routine shown by a flowchart in FIG. 9, every time a predetermined time elapses. Therefore, at an appropriate time point, the CPU starts processing of step 900 shown in FIG. 9, and proceeds to step 905 so as to determine whether or not the CPU is displaying the parking space selection screen G1.

When the CPU is not displaying the parking space selection screen G1, the CPU makes a "No" determination at step 905, and proceeds to step 995 to terminate the present routine tentatively.

In contrast, when the CPU is displaying the parking space selection screen G1, the CPU makes a "Yes" determination at step 905, and proceeds to step 910 so as to determine whether or not either one of the first perpendicular-parallel parking space selection button Bt3 and the second perpendicular-parallel parking space selection button Bt4 is being displayed in the first display mode.

When none of the first perpendicular-parallel parking space selection button Bt3 and the second perpendicular-parallel parking space selection button Bt4 is being displayed in the first display mode, the CPU makes a "No" determination at step 910, and proceeds to step 995 to terminate the present routine tentatively. In contrast, when either one of the first perpendicular-parallel parking space selection button Bt3 and the second perpendicular-parallel parking space selection button Bt4 is being displayed in the first display mode, the CPU makes a "Yes" determination at step 910, and proceeds to step 915. At step 915, the CPU determines whether or not either one of the first perpendicular-parallel parking space selection button Bt3 displayed in the first display mode and the second perpendicular-parallel parking space selection button Bt4 displayed in the first display mode has just been touched. Namely, the CPU determines whether one of the touch operation to the first perpendicular-parallel parking space selection button Bt3 displayed in the first display mode and the touch operation to the second perpendicular-parallel parking space selection button Bt4 displayed in the first display mode is performed.

When none of the first perpendicular-parallel parking space selection button Bt3 displayed in the first display mode and the second perpendicular-parallel parking space selection button Bt4 displayed in the first display mode has just been touched, the CPU makes a "No" determination at step 915, and proceeds to step 995 to terminate the present routine tentatively.

When either one of the first perpendicular-parallel parking space selection button Bt3 displayed in the first display mode and the second perpendicular-parallel parking space selection button Bt4 displayed in the first display mode has just been touched, the CPU makes a "Yes" determination at step 915, and proceeds to step 920.

At step 920, the CPU determines whether or not the button that has just been touched is the first perpendicular-parallel parking space selection button Bt3.

When the button that has just been touched is the first perpendicular-parallel parking space selection button Bt3, the CPU makes a "Yes" determination at step 920, executes process of step 925 described below, and thereafter proceeds to step 995 to terminate the present routine tentatively.

Step 925: the CPU stops displaying the first perpendicular-parallel parking space selection button Bt3 that has just been touched and the other first perpendicular-parallel parking space selection button(s) Bt3 present in the same area (hereinafter, referred to as a "specific same area") as the perpendicular-parallel parking possible space AR3 corresponding to the first perpendicular-parallel parking space selection button Bt3 that has just been touched, and instead, starts displaying the second perpendicular-parallel parking space selection button Bt4 in the first display mode within the specific same area. In other words, the CPU achieves a second display state in place of a first display state.

When the button that has just been touched is the second perpendicular-parallel parking space selection button Bt4, the CPU makes a "No" determination at step 920, executes process of step 930 described below, and thereafter proceeds to step 995 to terminate the present routine tentatively.

Step 930: the CPU stops displaying the second perpendicular-parallel parking space selection button Bt4 that has just been touched, and instead, starts displaying one or more of the first perpendicular-parallel parking space selection buttons Bt3. At this time, the CPU displays one of the first perpendicular-parallel parking space selection button(s) Bt3 (that is referred to as a "specific button Bt3") in the first display mode in such a manner that the specific button Bt3 is superimposed on the perpendicular parking possible space that has been selected as the (tentative) target parking space within the same area as the perpendicular-parallel parking possible space AR3 corresponding to the second perpendicular-parallel parking space selection button Bt4 that has just been touched. Furthermore, the CPU displays the other of the first perpendicular-parallel parking space selection button(s) Bt3, if any, in the second display mode in such a manner that the other button Bt3 is superimposed on the perpendicular parking possible space that has not been selected as the (tentative) target parking space within the same area as the perpendicular-parallel parking possible space AR3 corresponding to the second perpendicular-parallel parking space selection button Bt4 that has just been touched. In other words, the CPU achieves the first display state in place of the second display state.

As has been described above, the parking assist apparatus 10 is configured to display the parking possible space (i.e., perpendicular-parallel parking possible space) to which the vehicle 100 can be parallelly parked and perpendicularly parked on the single screen (parking space selection screen G1), before the final target parking space is determined and even before it is determined whether the autonomous parking assist is performed in accordance with the parallel parking or with the perpendicular parking. Therefore, the user can see (watch) that perpendicular-parallel parking possible space on the single screen before the user determines the final target parking space. Accordingly, the parking assist apparatus 10 can increase ease of use (improve convenience to the user). In addition, the parking assist apparatus 10 is configured to display, on the single screen, the parallel parking possible space, the perpendicular parking possible space, and the perpendicular-parallel parking possible space, to allow the user to recognize these spaces using the parking space selection screen. Accordingly, in this regard as well, the parking assist apparatus 10 can increase ease of use (improve convenience to the user).

The present disclosure is not limited to the above embodiment, and can employ various modifications within the scope of the present disclosure. For example, the shape of the buttons displayed on the parking space selection screen G1 may be different from those described above, and/or the first display mode may be different from the second display mode in way of lighting the buttons. Namely, the button may be intermittently turned on in the first display mode, and the button may be continued being on in the second display mode.

What is claimed is:

1. A parking assist apparatus, installed on a vehicle and configured to be capable of performing an autonomous parking control to move said vehicle from a parking start position to a final target parking space so that said vehicle is parked in said final target parking space, comprising:
    a camera device configured to capture images around said vehicle to obtain image information;
    a touch panel configured to display a screen; and
    a processor configured to change said screen displayed on said touch panel, wherein
    said processor is further configured to:
        specify, based on said image information, a parking possible space to which said vehicle is moved from said parking start position owing to said autonomous parking control;
        produce, based on said image information, a surrounding image that is an image of surroundings of said vehicle; and
        display, on said touch panel, a parking space selection screen including said surrounding image and a target parking space selection button corresponding to said parking possible space, said parking space selection screen being configured to be operated by a user of said vehicle to select said final target parking space from said parking possible space, in such a manner that said target parking space selection button is superimposed inside said parking possible space in said surrounding image,
    and wherein
    when said parking possible space is a perpendicular-parallel parking possible space that allows said vehicle to be parked in any one of a perpendicular manner and a parallel manner, said processor is further configured to achieve selectively one of a first display state and a second display state,
    said first display state being a state where a first perpendicular-parallel parking space selection button as said target parking space selection button is displayed in such a manner that said first perpendicular-parallel parking space selection button is superimposed inside a first parking possible space to which said vehicle is allowed to be parked in said perpendicular manner within said perpendicular-parallel parking possible space in said surrounding image, wherein, in said first display state, a long side of said first perpendicular-parallel parking space selection button is in a first direction, and
    said second display state being a state where a second perpendicular-parallel parking space selection button as said target parking space selection button is displayed in such a manner that said second perpendicular-parallel parking space selection button is superimposed inside a second parking possible space to which said vehicle is allowed to be parked in said parallel manner within said perpendicular-parallel parking possible space in said surrounding image, wherein, in said second display state, a long side of said second perpendicular-parallel parking space selection button is in a second direction, and wherein said second direction is perpendicular to said first direction,
    wherein said perpendicular-parallel parking space selection buttons further comprise an indicator of a direction of rotation.

2. The parking assist apparatus according to claim 1, wherein
    said processor is further configured to:
        change said first perpendicular-parallel parking space selection button from said first display state to said second display state, when said first perpendicular-parallel parking space selection button is touched; and
        change said second perpendicular-parallel parking space selection button from said second display state to said first display state, when said second perpendicular-parallel parking space selection button is touched.

3. The parking assist apparatus according to claim 1, wherein
    said processor is further configured to:
        when said parking possible space is a perpendicular parking possible space to which said vehicle is allowed to be parked in said perpendicular manner, display a perpendicular parking space selection button as said target parking space selection button in such a manner that said perpendicular parking space selection button is superimposed inside said perpendicular parking possible space; and
        when said parking possible space is a parallel parking possible space to which said vehicle is allowed to be parked in said parallel manner, display a parallel parking space selection button as said target parking space selection button in such a manner that said parallel parking space selection button is superimposed inside said parallel parking possible space.

4. The parking assist apparatus according to claim 3, wherein
    said processor is further configured to display said target parking space selection button in at least one of a first display mode and a second display mode, said target parking space selection button being displayed in said first display mode indicates that said parking possible space inside of which said target parking space selection button is displayed in said first display mode is tentatively selected as said final target parking space, and said target parking space selection button being displayed in said second display mode indicates that said parking possible space inside of which said target parking space selection button is displayed in said second display mode is not tentatively selected as said final target parking space.

5. The parking assist apparatus according to claim 1, wherein
    said first perpendicular-parallel parking space selection button comprises a first indication that said first parking possible space is within said perpendicular-parallel parking possible space, and
    said second perpendicular-parallel parking space selection button comprises a second indication that said second parking possible space is within said perpendicular-parallel parking possible space.

* * * * *